United States Patent
Jaynes

(10) Patent No.: US 9,096,104 B1
(45) Date of Patent: Aug. 4, 2015

(54) CROSS MEMBER TOWING HITCH

(71) Applicant: Fontaine Modification Company, Charlotte, NC (US)

(72) Inventor: Dan R. Jaynes, Mount Holly, NC (US)

(73) Assignee: FONTAINE MODIFICATION COMPANY, Charlotte, NC (US)

( * ) Notice: Subject to any disclaimer, the term of this patent is extended or adjusted under 35 U.S.C. 154(b) by 0 days.

(21) Appl. No.: 14/594,419

(22) Filed: Jan. 12, 2015

Related U.S. Application Data

(60) Provisional application No. 61/925,758, filed on Jan. 10, 2014.

(51) Int. Cl.
 *B60D 1/48* (2006.01)
 *B62D 25/20* (2006.01)
 *B60D 1/24* (2006.01)

(52) U.S. Cl.
 CPC .. *B60D 1/48* (2013.01); *B60D 1/24* (2013.01); *B60D 1/485* (2013.01); *B60D 1/488* (2013.01); *B62D 25/20* (2013.01)

(58) Field of Classification Search
 CPC .......... B60D 1/48; B60D 1/485; B60D 1/488; B62D 25/20
 USPC ............. 280/402, 407.1, 410, 495; 296/184.1
 See application file for complete search history.

(56) References Cited

U.S. PATENT DOCUMENTS

| | | | | |
|---|---|---|---|---|
| 3,768,837 A * | 10/1973 | Reese | ............................. | 280/495 |
| 4,015,857 A * | 4/1977 | Ross et al. | ..................... | 280/495 |
| 4,273,369 A * | 6/1981 | Rosenbaum | ....................... | 293/1 |
| 4,557,497 A * | 12/1985 | Rumminger | ................... | 280/403 |
| 4,645,227 A * | 2/1987 | Callahan | ......................... | 280/495 |
| 6,179,320 B1 * | 1/2001 | Chou et al. | ...................... | 280/500 |
| 6,183,185 B1 * | 2/2001 | Zanzig et al. | ................. | 414/408 |
| 7,472,919 B2 * | 1/2009 | Pratt et al. | ................... | 280/480.1 |
| 7,527,309 B2 * | 5/2009 | Smidler | ......................... | 293/155 |
| 8,424,913 B1 * | 4/2013 | Schunke et al. | .............. | 280/800 |
| 8,720,932 B2 * | 5/2014 | Kim et al. | ................... | 280/491.1 |
| 2002/0041078 A1 * | 4/2002 | Aquinto et al. | ............... | 280/500 |
| 2011/0198826 A1 * | 8/2011 | Weber et al. | ................... | 280/480 |
| 2011/0204594 A1 * | 8/2011 | Garth | ......................... | 280/491.1 |
| 2013/0277945 A1 * | 10/2013 | McCoy | .......................... | 280/495 |

FOREIGN PATENT DOCUMENTS

| | | | |
|---|---|---|---|
| EP | 1932690 A1 * | 6/2008 | |
| EP | 2316670 A1 * | 5/2011 | |
| EP | 2596966 A1 * | 5/2013 | |
| WO | WO 2009072939 A1 * | 6/2009 | |

* cited by examiner

*Primary Examiner* — Joseph Rocca
*Assistant Examiner* — Daniel Yeagley
(74) *Attorney, Agent, or Firm* — DLA Piper LLP (US); R. Blake Johnston

(57) ABSTRACT

A cross member towing hitch includes a cap adapted to engage outer surfaces of a pair of frame rails of a towing vehicle, where the cap includes a hitch plate. A brace is adapted to fit between the pair of frame rails and engages inner surfaces of the pair of frame rails. The brace has strengthening ribs and a central panel adapted to abut an inner surface of the hitch plate. The central panel of the brace and hitch plate having corresponding fastening holes that align so that a hitch mechanism may be secured to the hitch plate and brace.

14 Claims, 5 Drawing Sheets

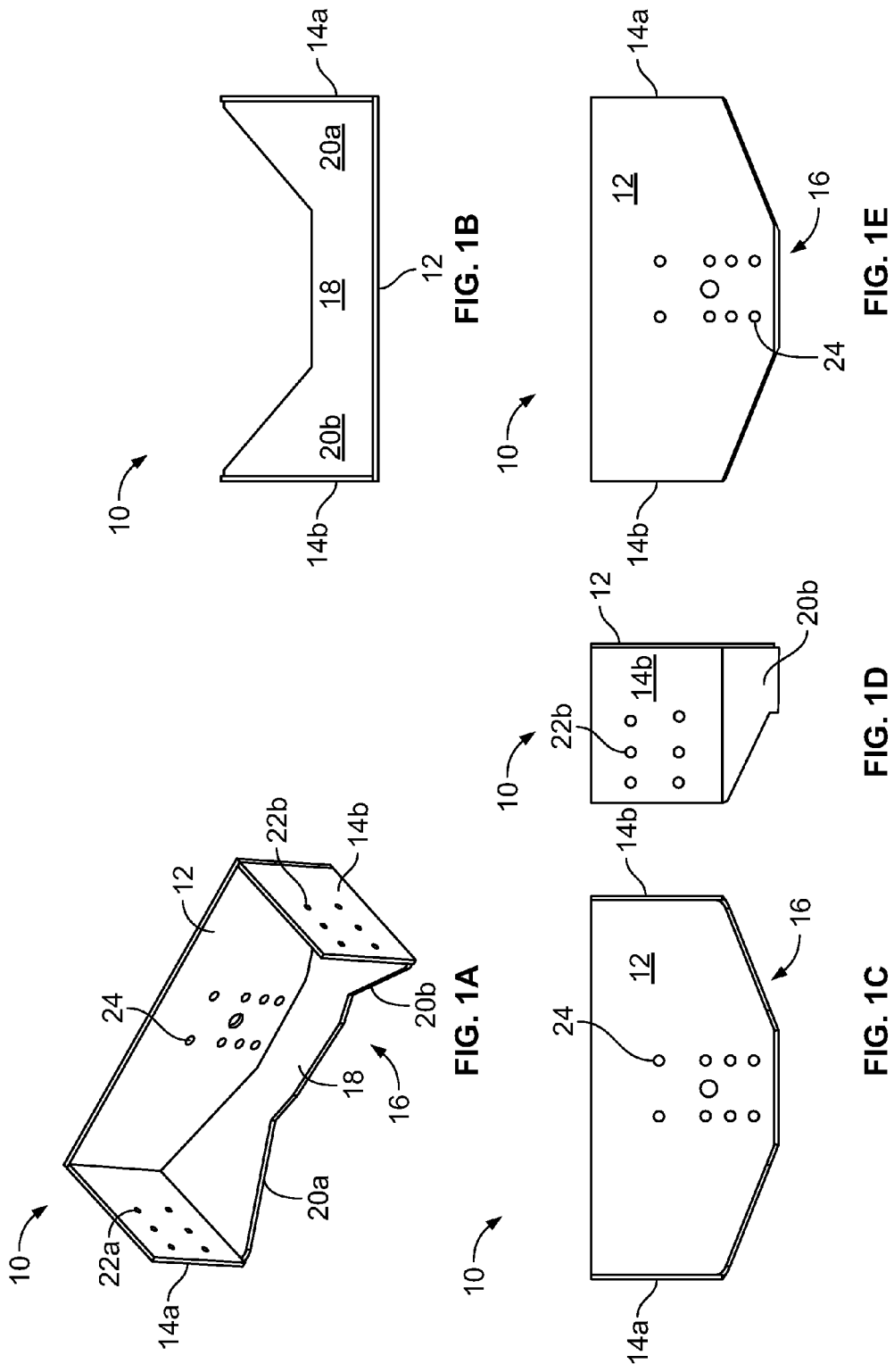

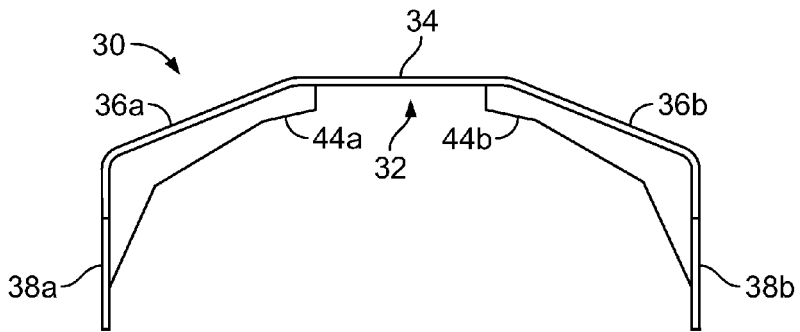
FIG. 2A
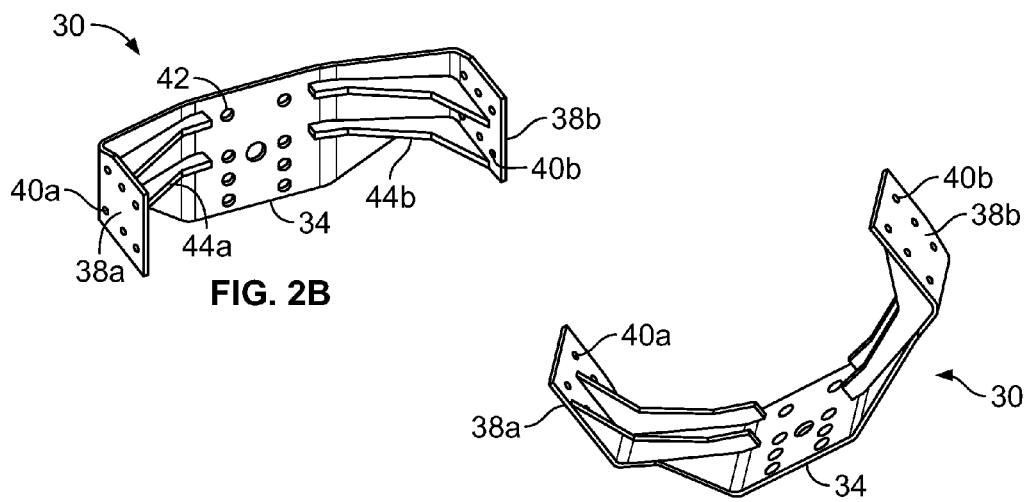
FIG. 2B
FIG. 2C
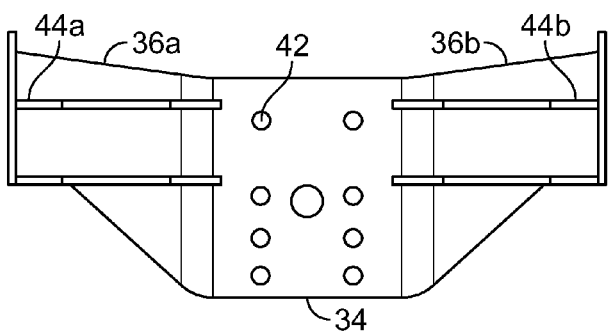
FIG. 2D
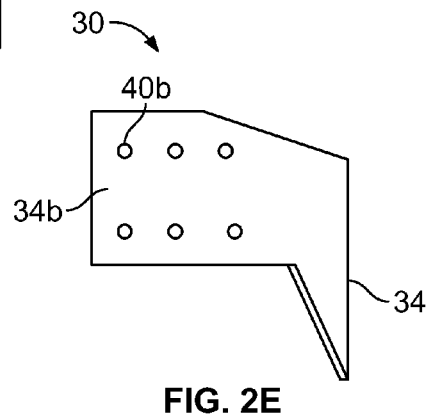
FIG. 2E

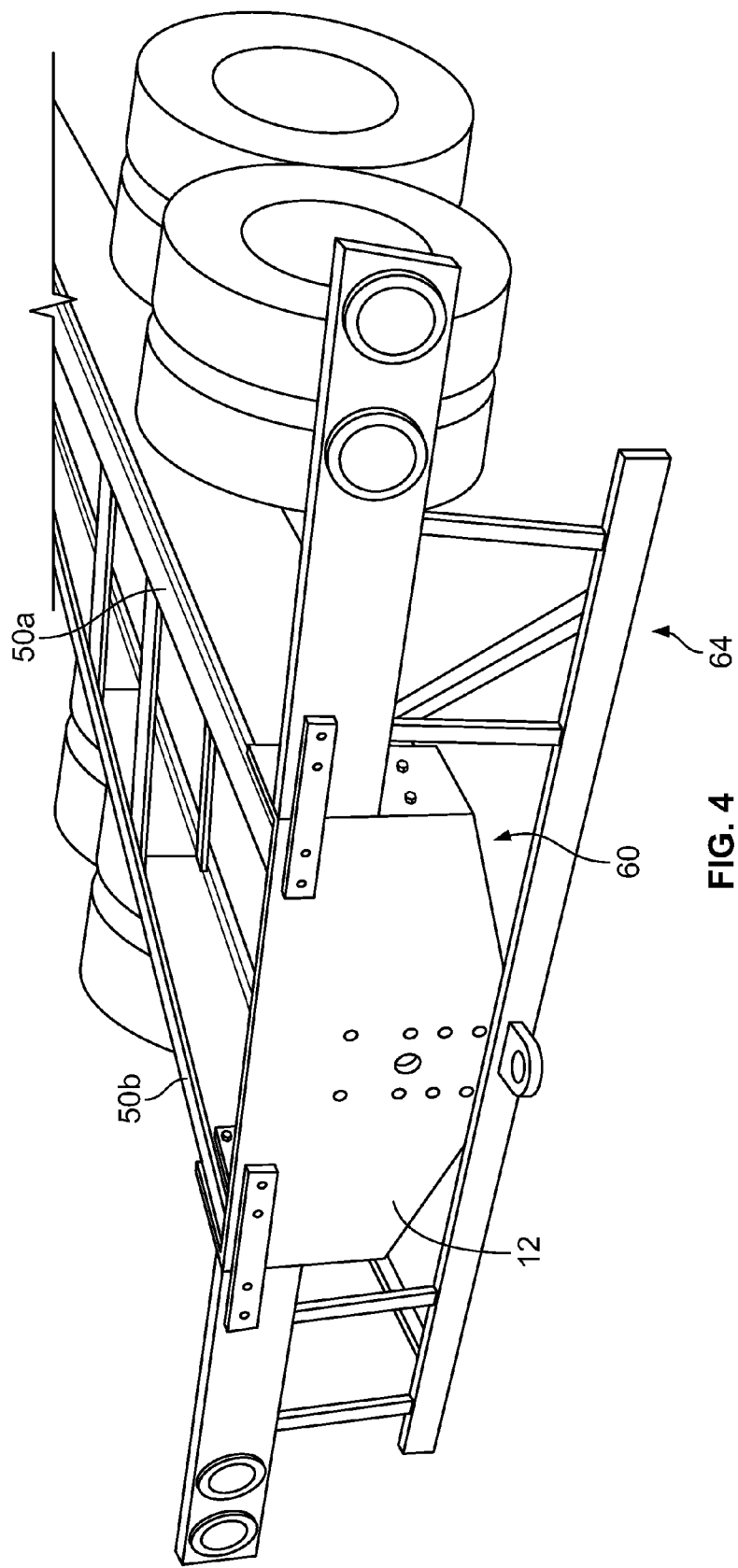

CROSS MEMBER TOWING HITCH

CROSS REFERENCE TO RELATED APPLICATIONS

This application claims priority from U.S. Provisional Application Ser. No. 61/925,758 filed Jan. 10, 2014, the entirety of which is incorporated herein by reference.

FIELD OF THE INVENTION

The present invention relates generally to hitches for attaching trailers behind a towing vehicle and, in particular, to a cross member towing hitch that attaches to the frame rails of the towing vehicle to enable towing of trailers loaded with heavy equipment or other heavy loads.

BRIEF DESCRIPTION OF THE DRAWINGS

FIG. 1A is a perspective view of the cap of an embodiment of the cross member towing hitch of the present invention;

FIG. 1B is a top plan view of the cap of FIG. 1A;

FIG. 1C is a front elevational view of the cap of FIG. 1A;

FIG. 1D is a side elevational view of the cap of FIG. 1A;

FIG. 1E is a rear elevational view of the cap of FIG. 1A;

FIG. 2A is a top elevational view of the brace of an embodiment of the cross member towing hitch of the present invention;

FIG. 2B is a top perspective view of the brace of FIG. 2A;

FIG. 2C is a bottom perspective view of the brace of FIG. 2A;

FIG. 2D is a front elevational view of the brace of FIG. 2A;

FIG. 2E is a side elevational view of the brace of FIG. 2A;

FIG. 4 is a rear perspective view showing the cross member towing hitch of FIGS. 3A and 3B installed on a truck without the hitch mechanism installed;

DETAILED DESCRIPTION OF EMBODIMENTS

Figure 3A:
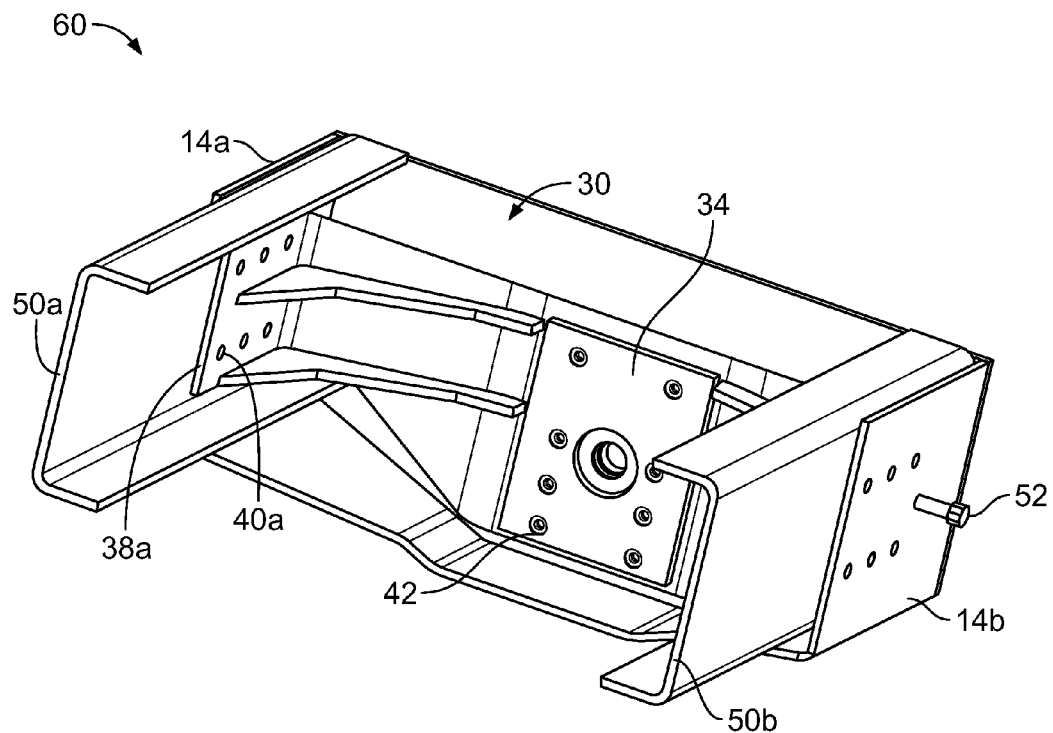
FIG. 3A is a front perspective view of the cap and brace of FIGS. 1A-1E and FIGS. 2A-2E installed on the frame rails of a towing vehicle in accordance with an embodiment of the cross member towing hitch of the present invention.

Often times trucks and other towing vehicles must be used to pull heavy trailers (such as those loaded with heavy equipment) and other heavy loads. Towing hitches must therefore be securely installed to such towing vehicles and be capable of withstanding very high pulling forces. It is also desirable that the towing hitch be easy to install to the towing vehicle. Embodiments of the present invention address these issues.

The cross member trailer hitch of the present invention includes two main components: a cap (FIGS. 1A-1E) and a brace (FIGS. 2A-2E).

With reference to FIGS. 1A-1E, the cap is indicated in general at 10 and includes a hitch plate 12, opposing side plates 14a and 14b and a bottom cover, indicated in general at 16. The bottom cover features a central bottom panel 18 flanked by angled plates 20a and 20b, which are attached to the side plates 14a and 14b, so that the bottom cover corresponds to the shape of, and is attached to, the bottom edge of the hitch plate. The panels or plates of the cap are preferably secured together by welds. Alternatively, the plates may be secured together by other fastening arrangements known in the art.

The side plates 14a and 14b of the cap are provided with fastening holes 22a and 22b, while the hitch plate is provided with fastening holes 24.

Turning to FIGS. 2A-2E, an embodiment of the brace is illustrated. The brace, indicated in general at 30, includes a generally V-shaped body 32 having a central panel 34 flanked by, and attached to, angled panels 36a and 36b. The outer edges of the angled panels 36a and 36b are attached to side panels 38a and 38b. The body preferably is constructed from a single plate of steel that is bent into the illustrated generally V-shape. The side panels 38a and 38b are provided with fastening holes 40a and 40b, while the central panel 34 is provided with fastening holes 42.

As indicated at 44a and 44b in FIGS. 2A-2E, the brace 10 is also provided with strengthening ribs that are preferably welded to the side and angled panels of the brace.

Figure 3B:
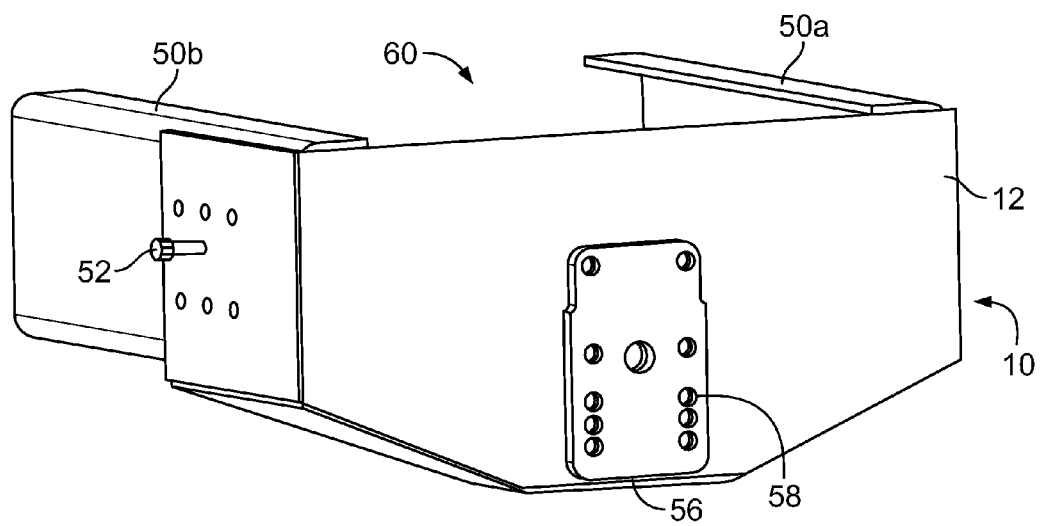
FIG. 3B is a rear perspective view of the cap and brace and towing vehicle frame rails of FIG. 3A.

During installation, as illustrated in FIGS. 3A and 3B, the end portions of existing OEM frame rails 50a and 50b of a truck or other towing vehicle are sandwiched between the cap 10 and brace 30 of FIGS. 1A-1E and 2A-2E, respectively. More specifically, the cap 10 is positioned so that the inner surfaces of the side plates 14a and 14b overlay the outer surfaces of the frame rails 50a and 50b with the inner surface of the hitch plate 12 abutting the ends of the frame rails 50a and 50b. In addition, as illustrated in FIGS. 3A and 3B, the brace 30 is positioned between the frame rails 50a and 50b so that the outer surfaces of the side panels 38a and 38b of the brace overlay portions of the inner surfaces of the frame rails while the outer surface of the central panel 34 of the brace overlays a portion of the inner surface of the hitch plate 12 of the cap so that the fastening holes 24 (FIGS. 1A-1E) of the cap and fastening holes 42 of the brace are aligned.

As further illustrated in FIGS. 3A and 3B, the fastening holes 40a and 40b of the brace side panels 38a and 38b also align with the fastening holes 22a and 22b of the cap side plates 14a and 14b. Corresponding holes are drilled or otherwise formed through the frame rails 50a and 50b and fasteners, such as bolt 52 of FIGS. 3A and 3B, are placed there through to secure the assembled cross member towing hitch, indicated in general at 60 in FIGS. 3A and 3B, to the frame rails 50a and 50b of the truck or other towing vehicle.

An alternative view of the assembled cross member towing hitch 60 attached to the frame rails 50a and 50b is presented in FIG. 4.

Figure 5:
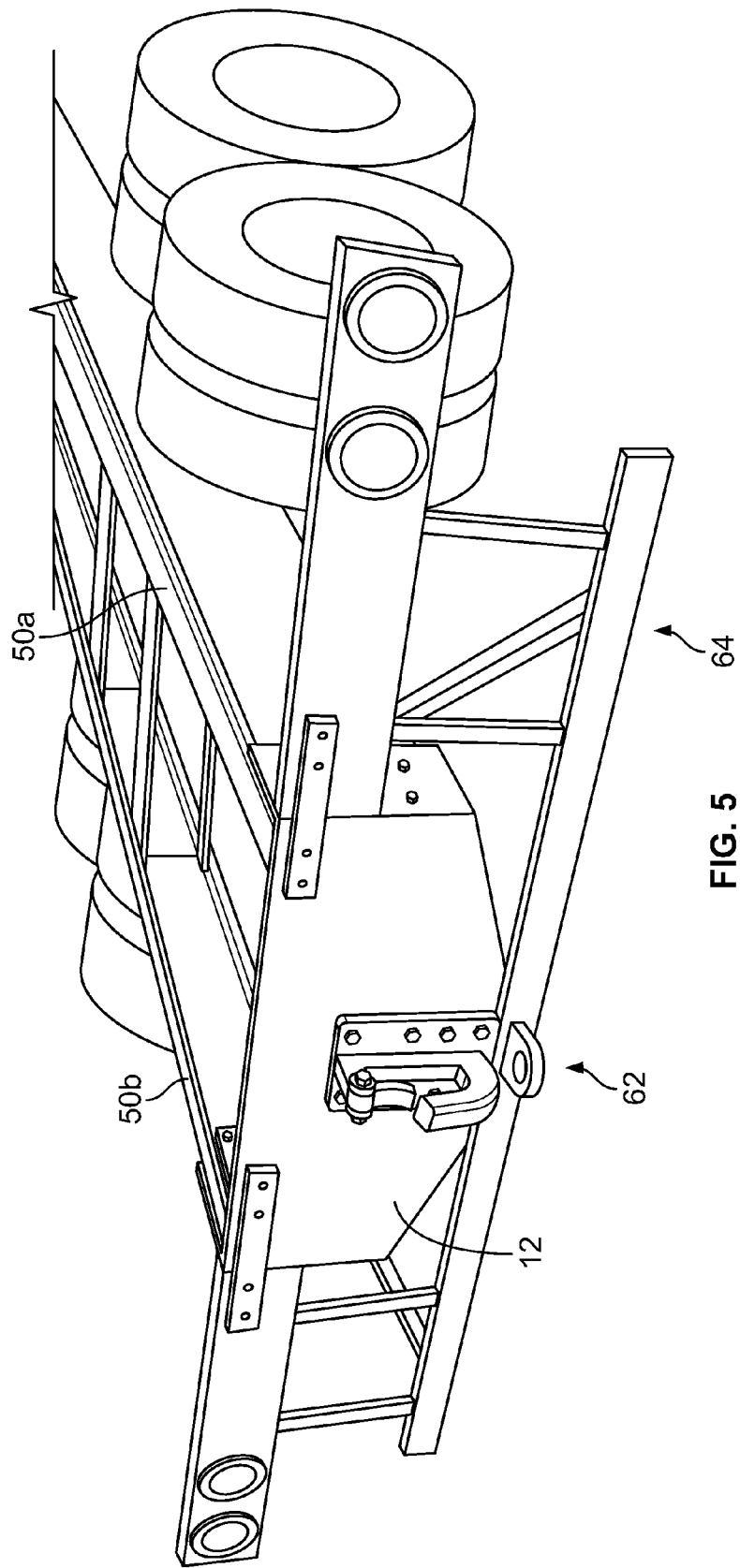
FIG. 5 illustrates the cross member towing hitch of FIG. 4 with the hitch mechanism installed.

As shown in FIGS. 3A and 3B, a hitch mechanism plate 56, having fastening holes 58 that correspond and align with the fastening holes 42 of the brace and fastening holes 24 (FIGS. 1A-1E) of the cap, is placed over the outer surface of the hitch plate 12. The hitch mechanism plate 56 may then be secured in place with bolts that pass through the aligned fastening holes of the brace, cap hitch plate and hitch mechanism plate. The remaining portion of the hitch mechanism, indicated in general at 62 in FIG. 5, is attached to the hitch plate 12 of FIGS. 3A and 3B. As is shown in FIG. 5, the shapes of the components of the cross member towing hitch permit the hitch mechanism 62 to be mounted vertically lower than the towing vehicle frame rails 50a and 50b to accommodate trailer height. In addition, as illustrated in FIGS. 4 and 5, a non-structural bumper extension 64 may optionally be added and attached to the hitch plate 12.

Each component (cap and brace) is preferably constructed from steel panels or plates, each having a 70 KSI yield strength and a thickness of ⅜ inches. Other materials and dimensions may be used. As a result, and as an example only, the illustrated cross member towing hitch has a 60,000 pound pull capacity While the preferred embodiments of the invention have been shown and described, it will be apparent to those skilled in the art that changes and modifications may be made therein without departing from the spirit of the invention, the scope of which is defined by the following claims.

What is claimed is:

1. A cross member towing hitch comprising:
   a. a cap adapted to engage outer surfaces of a pair of frame rails of a towing vehicle, said cap including a hitch plate;
   b. a brace adapted to fit between the pair of frame rails and engage inner surfaces of the pair of frame rails, said brace having strengthening ribs and a central panel adapted to abut an inner surface of the hitch plate; and
   c. said central panel of the brace and hitch plate having corresponding fastening holes that align so that a hitch mechanism may be secured to the hitch plate and brace.

2. The cross member towing hitch of claim 1 wherein the cap includes a pair of side plates that engage the outer surfaces of the pair of frame rails and the brace includes a pair of side panels that engage the inner surfaces of the pair of frame rails.

3. The cross member towing hitch of claim 2 wherein the pair of side plates and the pair of side panels include corresponding fastening holes that align when the cap and brace are attached to the pair of frame rails.

4. The cross member towing hitch of claim 2 further comprising a pair of angled panels that connect the pair of side panels to the central panel of the brace.

5. The cross member towing hitch of claim 4 wherein the strengthening ribs are secured to the pair of side panels and the pair of angled panels.

6. The cross member towing hitch of claim 2 wherein the cap includes a bottom cover attached to the hitch plate and the pair of side plates.

7. The cross member towing hitch of claim 1 wherein the cap and brace are each constructed from welded steel plates.

8. A towing vehicle comprising:
   a. a pair of frame rails, each having an inner surface and an outer surface;
   b. a cross member towing hitch comprising:
      i) a cap engaging the outer surfaces of the pair of frame rails, said cap including a hitch plate;
      ii) a brace positioned between the pair of frame rails and engaging the inner surfaces of the pair of frame rails, said brace having strengthening ribs and a central panel abutting an inner surface of the hitch plate;
      iii) said central panel of the brace and the hitch plate having aligned fastening holes; and
      iv) a hitch mechanism secured to the hitch plate and brace.

9. The towing vehicle of claim 8 wherein the cap includes a pair of side plates that engage the outer surfaces of the pair of frame rails and the brace includes a pair of side panels that engage the inner surfaces of the pair of frame rails.

10. The towing vehicle of claim 9 wherein the pair of side plates and the pair of side panels include corresponding fastening holes that align when the cap and brace are attached to the pair of frame rails.

11. The towing vehicle of claim 9 further comprising a pair of angled panels that connect the pair of side panels to the central panel of the brace.

12. The towing vehicle of claim 11 wherein the strengthening ribs are secured to the pair of side panels and the pair of angled panels.

13. The towing vehicle of claim 9 wherein the cap includes a bottom cover attached to the hitch plate and the pair of side plates.

14. The towing vehicle of claim 8 wherein the cap and brace are each constructed from welded steel plates.

* * * * *